United States Patent [19]
Kim

[11] Patent Number: 6,097,656
[45] Date of Patent: Aug. 1, 2000

[54] HIGH SPEED EMPTY FLAG GENERATOR

[75] Inventor: Doo-Young Kim, Pusan, Rep. of Korea

[73] Assignee: LG Semicon Co., Ltd., Cheongju, Rep. of Korea

[21] Appl. No.: 09/277,193

[22] Filed: Mar. 26, 1999

[30] Foreign Application Priority Data

Aug. 14, 1998 [KR] Rep. of Korea ................. 98-33083

[51] Int. Cl.[7] ........................................ G11C 7/00
[52] U.S. Cl. ........................ 365/221; 365/189.07
[58] Field of Search ..................... 365/221, 189.07, 365/205, 220

[56] References Cited

U.S. PATENT DOCUMENTS

| | | | |
|---|---|---|---|
| 4,873,666 | 10/1989 | Lefebvre et al. | 365/189.07 |
| 5,097,442 | 3/1992 | Ward et al. | 365/78 |
| 5,214,607 | 5/1993 | Duzan | 365/221 |
| 5,278,956 | 1/1994 | Thomsen et al. | 395/250 |
| 5,365,485 | 11/1994 | Ward et al. | 365/221 |
| 5,426,612 | 6/1995 | Ichige et al. | 365/221 |
| 5,508,679 | 4/1996 | McClure | 365/189.07 |
| 5,555,524 | 9/1996 | Castellano | 365/221 |
| 5,557,575 | 9/1996 | Lee | 365/221 |
| 5,956,748 | 9/1999 | New | 711/149 |

*Primary Examiner*—Richard Elms
*Assistant Examiner*—Anh Phung
*Attorney, Agent, or Firm*—Fleshner & Kim, LLP

[57] ABSTRACT

The present invention relates to a high speed empty flag generator and a method of generating a high speed empty flag which are achieved by generating a pre-empty flag in a clock ahead of a read address which is identical to a write address and by generating an empty flag as soon as a read address identical to the write address is generated after an elapse of one clock. The present invention includes a subtracter generating upper N−1 bits of a value resulted from subtracting 1 from a write address of N bits, a pre-empty flag generator generating an pre-empty flag when an output of upper N−1 bits of a rear address of N bits and an output of N−1 bits of the subtracter coincide by comparison, and a main empty flag receiving said pre-empty flag wherein the main empty flag generator generating an empty flag at a generating point of a first read signal after the pre-empty flag.

15 Claims, 4 Drawing Sheets

| WR_ADD[3:0] | WR_ADD-1[3:0] | WR_ADD-1[3:1] | RD_ADD[3:1] | XNOR(26~28),XOR(29) | PRE_EF |
|---|---|---|---|---|---|
| 0 0 0 0 | 1 1 1 1 | 1 1 1 | 1 1 1 1 | 1 1 1 1 | 1 |
| 0 0 0 1 | 0 0 0 0 | 0 0 0 | 0 0 0 0 | 1 1 1 1 | 1 |
| 0 0 1 0 | 0 0 0 1 | 0 0 0 | 0 0 0 1 | 1 1 1 1 | 1 |
| 0 0 1 1 | 0 0 1 0 | 0 0 1 | 0 0 1 0 | 1 1 1 1 | 1 |
| 0 1 0 0 | 0 0 1 1 | 0 0 1 | 0 0 1 1 | 1 1 1 1 | 1 |
| 0 1 0 1 | 0 1 0 0 | 0 1 0 | 0 1 0 0 | 1 1 1 1 | 1 |
| 0 1 1 0 | 0 1 0 1 | 0 1 0 | 0 1 0 1 | 1 1 1 1 | 1 |
| 0 1 1 1 | 0 1 1 0 | 0 1 1 | 0 1 1 0 | 1 1 1 1 | 1 |
| 1 0 0 0 | 0 1 1 1 | 0 1 1 | 0 1 1 1 | 1 1 1 1 | 1 |
| 1 0 0 1 | 1 0 0 0 | 1 0 0 | 1 0 0 0 | 1 1 1 1 | 1 |
| 1 0 1 0 | 1 0 0 1 | 1 0 0 | 1 0 0 1 | 1 1 1 1 | 1 |
| 1 0 1 1 | 1 0 1 0 | 1 0 1 | 1 0 1 0 | 1 1 1 1 | 1 |
| 1 1 0 0 | 1 0 1 1 | 1 0 1 | 1 0 1 1 | 1 1 1 1 | 1 |
| 1 1 0 1 | 1 1 0 0 | 1 1 0 | 1 1 0 0 | 1 1 1 1 | 1 |
| 1 1 1 0 | 1 1 0 1 | 1 1 0 | 1 1 0 1 | 1 1 1 1 | 1 |
| 1 1 1 1 | 1 1 1 0 | 1 1 1 | 1 1 1 1 | 1 1 1 1 | 1 |

FIG. 4

HIGH SPEED EMPTY FLAG GENERATOR

BACKGROUND OF THE INVENTION

1. Field of Invention

The present invention relates to a control circuit of First-In-First-Out memory and It's control method, more particularly to a empty flag generator which generates an empty flag indicating that there is no data in the FIFO memory.

2. Discussion of Related Art

FIFO memory is a kind of memory devices used in a multi-processor, a serial communication network, fax, a modem and the like as a buffer. In the FIFO memory, input and output of data is implemented in a different way from general memory devices. That is to say, first inputted data is outputted first as the term "FIFO" means.

Information of the size of data stored in FIFO memory is required for using the FIFO memory]. Generally, a FIFO memory control circuit detects the present size of data stored in FIFO memory by comparing an address of a memory region which the data has been written lately from address of memory region which the data has been read lately.

For an effective control of FIFO memory, it is necessary to detect an empty state or full state of FIFO memory. Namely, unnecessary access to read data is avoided by detecting that there is no data in FIFO memory as well as that FIFO memory is full of data.

FIFO memory is equipped with an empty flag generator for an Empty Flag and a full flag generator for Full Flag. The empty flag generator generates an empty flag when a write address is identical to a read address. Because, the fact that the write address is identical to the read address means all the data in FIFO memory is outputted.

FIG. 1 shows a block diagram of a FIFO memory control circuit according to a related art. The FIFO memory control circuit is disclosed at U.S. Pat. No. 4,873,666 end invented by Martin C. Lefebvre, Carmine A. Ciancibello, and Youssef A. Geadah.

Referring to FIG. 1, a write counter 101 and a read counter 102 generate a write address WR_ADD and read address RD_ADD, respectively. The write address WR_ADD is inputted to a write register 103, a comparator 106 and a multiplexer 107. The read address RD_ADD is inputted to a read register 104, a comparator 105 and the multiplexer 107.

The comparator 105 generates an empty flag EF by comparing the write address WR_ADD to the read address RD_ADD. The other comparator 106 generates a full flag by comparing the write address WR_ADD to the read address RD_ADD.

The multiplexer 107 transfers either an inputted read address RD_ADD or an inputted write address WR_ADD to FIFO memory 108. When write address WR_ADD is generated, data is inputted to FIFO memory 108 with the write address WR_ADD. Because the write address WR_ADD is generated for the writing of data in FIFO memory 108. In this case, a FIFO memory control circuit 100 controls FIFO memory 108 in order to have data which is inputted to FIFO memory 108 to be written in a memory region designated by the corresponding write address WR_ADD.

Otherwise, when the read address RD_ADD is generated, there occurs no data input. Because the read address RD_ADD is generated for reading data form FIFO memory 108. In this case, the FIFO memory control circuit 100 controls FIFO Memory 108 in order to have data in memory region which is designated by a corresponding read address RD_ADD be outputted.

In the related art, an empty flag is generated by detecting that every bit of write address is identical to every bit of read address. Namely, An empty flag is generated by detecting that a read address is identical to a write address.

A speed of generating an empty flag increases provided that a pre-empty flag is generated in a clock before a read address which is identical to a write address and that an empty flag is generated as soon as a read address identical to the write address is generated after an elapse of one clock.

SUMMARY OF THE INVENTION

Accordingly, the present invention is directed to a high speed empty flag generator that substantially obviates one or more of the problems due to limitations an disadvantages of the related art.

The object of the present invention is to provide a high speed empty flag generator and a method of generating a high speed empty flag which are achieved by generating a pre-empty flag in a clock ahead of a read address which is identical to a write address and by generating an empty flag as soon as a read address identical to the write address is generated after an elapse of one clock.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention of an empty flag generator in FIFO memory control circuit includes a subtracter, a pre-empty flag generator and a main empty flag generator.

The subtracter generates upper $N-1$ bits of a value resulted from subtracting 1 from a write address of N bits.

The pre-empty flag generator generates an pre-empty flag when an output of upper $N-1$ bits of a read address of N bits and an output of $N-1$ bits of the subtracter coincide by comparison.

The main empty flag generator receive the pre-empty flag and generates an empty flag when first read signal is generated after the pre-empty flag is generated.

In another aspect of the present invention, a FIFO memory control circuit includes a read counter, a write counter, an empty flag generator, a full flag generator, and a multiplexer.

A read counter increases a read address of N bits by 1 every time a read signal is generated. A write counter increases a write address of N bits by 1 every time a write signal is generated. An empty flag generator includes a subtracter, a pre-empty flag generator and a main empty flag generator. A subtracter generates upper $N-1$ bits of a value resulted from subtracting 1 from the write address. A pre-empty flag generator generates a pre-empty flag when the $N-1$ bits of the read address and an output of $N-1$ bits of the write address are compared thereof and coincide. And a main empty flag generator receives the pre-empty flag and generates an empty flag at a generating point of a first read signal after the pre-empty flag has been inputted.

A full flag generator generates a full flag by comparing the read address to the write address.

And a multiplexer selects either the read address or the write address and transfers to FIFO memory.

In a further aspect of the present invention, the present invention of a method of generating an empty flag in FIFO memory circuit includes the steps of generating a pre-empty flag when upper N−1 bits of a value resulted from subtracting 1 from a write address of N bits coincide with an output of upper N−1 bits of a read address of N bits by comparison, and generating an empty flag at a generating point of a first read signal after the pre-empty flag has been generated.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this application, illustrate embodiments of the inventing and together with the description serve to explain the principle of the invention.

In the drawings:

FIG. 4 shows a truth table relating to operational characteristics of an empty flag generator according to the present invention.

DETAILED DESCRIPTION OF PREFERRED EMBODIMENTS

Reference will now be made in detail to the preferred embodiment of the present invention, an example of which is illustrated in the accompanying drawings.

Figure 1:
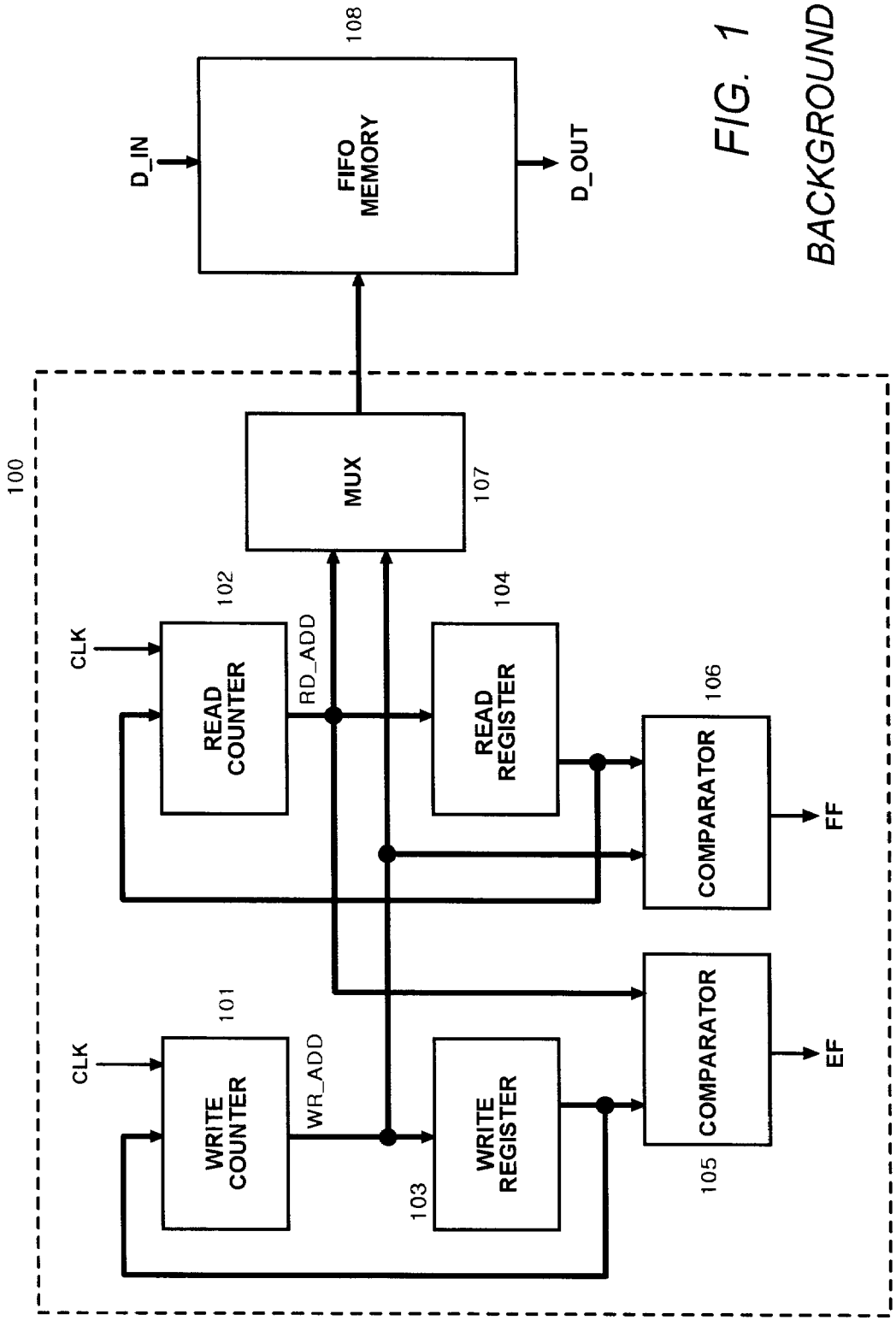
FIG. 1 shows a block diagram of a FIFO memory control circuit according to a related art.
Figure 2:
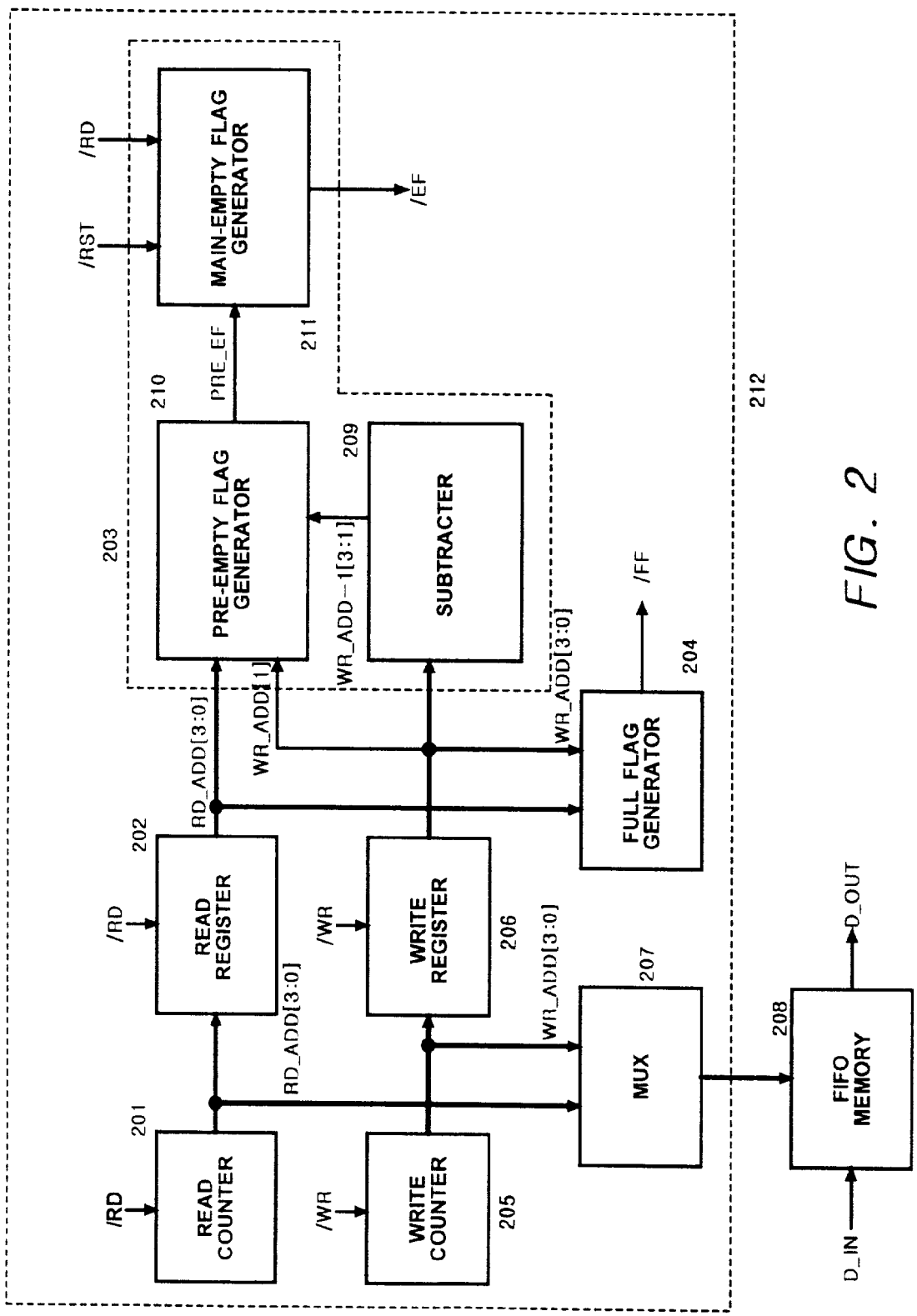
FIG. 2 shows a block diagram of a FIFO memory control circuit according to the present invention.

FIG. 2 shows a block diagram of a FIFO memory control circuit according to the present invention wherein a read address RD_ADD[3:0] and a write address WR_ADD[3:0] are of four bits respectively.

Referring to FIG. 2, a read counter 201 increases a read address RD_ADD[3:0] by 1 every time a read signal /RD is generated, and then outputs the read address to a read register 292 and a multiplexer 207.

The read register 202 receives and stores the read address RD_ADD[3:0] outputted from the read counter 201. The read register 202 uses the read signal /RD as a clock. Every time a logical value of the read signal /RD transits to 0, the read address RD_ADD[3:0] stored in the read register 202 is outputted. And, every time a read signal transits to 1, a new read address RD_ADD[3:0] is received and stored by the read register. The read address RD_ADD[3:0] outputted from the read register 202 is transferred to an empty flag generator 203 and a full flag generator 204.

A write counter 205 increases a write address WR_ADD [3:0] by 1 and outputs the write address WR_ADD[3:0] to a write register 206 and a multiplexer 207 whenever a write signal /WR is generated.

The write register 206 receives and stores the read address WD_ADD[3:0] outputted from the write counter 205. The write register 206 uses the read signal /WR as a clock. Every time the write signal /WR transits to 0, the write address WR_ADD[3:0] stored in the write register 206 is outputted. And, every time the write signal transits to 1, the write register 206 received and stored a new write address WR_ADD[3:0]. The write address WR_ADD[3:0] outputted from the write register 206 is inputted to the empty flag generator 203 and the full flag generator 204.

The empty flag generator 203 is comprised of a subtracter 209, a pre-empty flag generator 210 and a main empty flag generator 211. The write address WR_ADD[3:0] outputted from the write register 206 is inputted to the subtracter 209. The read address RD_ADD[3:0] outputted from the read register 202 and a least significant bit of the write address WR_ADD[0] outputted from the write register 206 are inputted to the pre-empty flag generator 210.

The subtracter 209 generates an upper 3 bits WR_ADD-1[3:1] of a value of subtracting 1 from the inputted write address WR_ADD[3:0] and, then, outputs the value to the pre-empty flag generator 210.

The pre-empty flag generator 210, comparing upper 3 bits RD_ADD[3:1] of a read address to upper 3 bits WR_ADD-1[3:1] resulted from subtracting 1 from a write address WR_ADD[3:0], generates a pre-empty flag PRE_EF provided that both values are equal each other. Otherwise, the pre-empty flag generator 210 does not generate a pre-empty flag PRE_EF. The pre-empty flag is the core of the present invention of an empty flag generator.

The main empty flag generator 211 receives the pre-empty flag PRE_EF and a reset signal /RST, and generates an empty flag /EF by carrying out certain logical operation with them. The main empty flag generator 211 generates an empty flag /EF of a logic 0 provided that a logical value of a read signal /RD becomes 0 as soon as a logical value of the pre-empty flag becomes 1.

A full flag generator 204 generates a full flag /FF by comparing a read address RD_ADD[3:0] to a write address WR_ADD[3:0].

A multiplexer 207 transfers either an inputted read address RD_ADD[3:0] or an inputted write address WR_ADD[3:0] to FIFO memory 208. Data D_IN is also inputted to FIFO memory 208 because generation of the write address WR_ADD[3:0] means that the data is to be recorded in FIFO memory 208. In this case, a FIFO memory control circuit 212 controls FIFO memory 208 in order that data D_IN inputted to FIFO memory 208 should be recorded in a memory region designated by a corresponding write address WR_ADD[3:0].

On the other hand, the generation of a read address RD_ADD[3:0] means that data in FIFO memory is to be read. Thus, data input never occurs. In this case, the FIFO memory control circuit 212 controls FIFO memory 208 in order that data in a memory region designated by a corresponding read address RD_ADD[3:0] is to be withdrawn.

Figure 3:
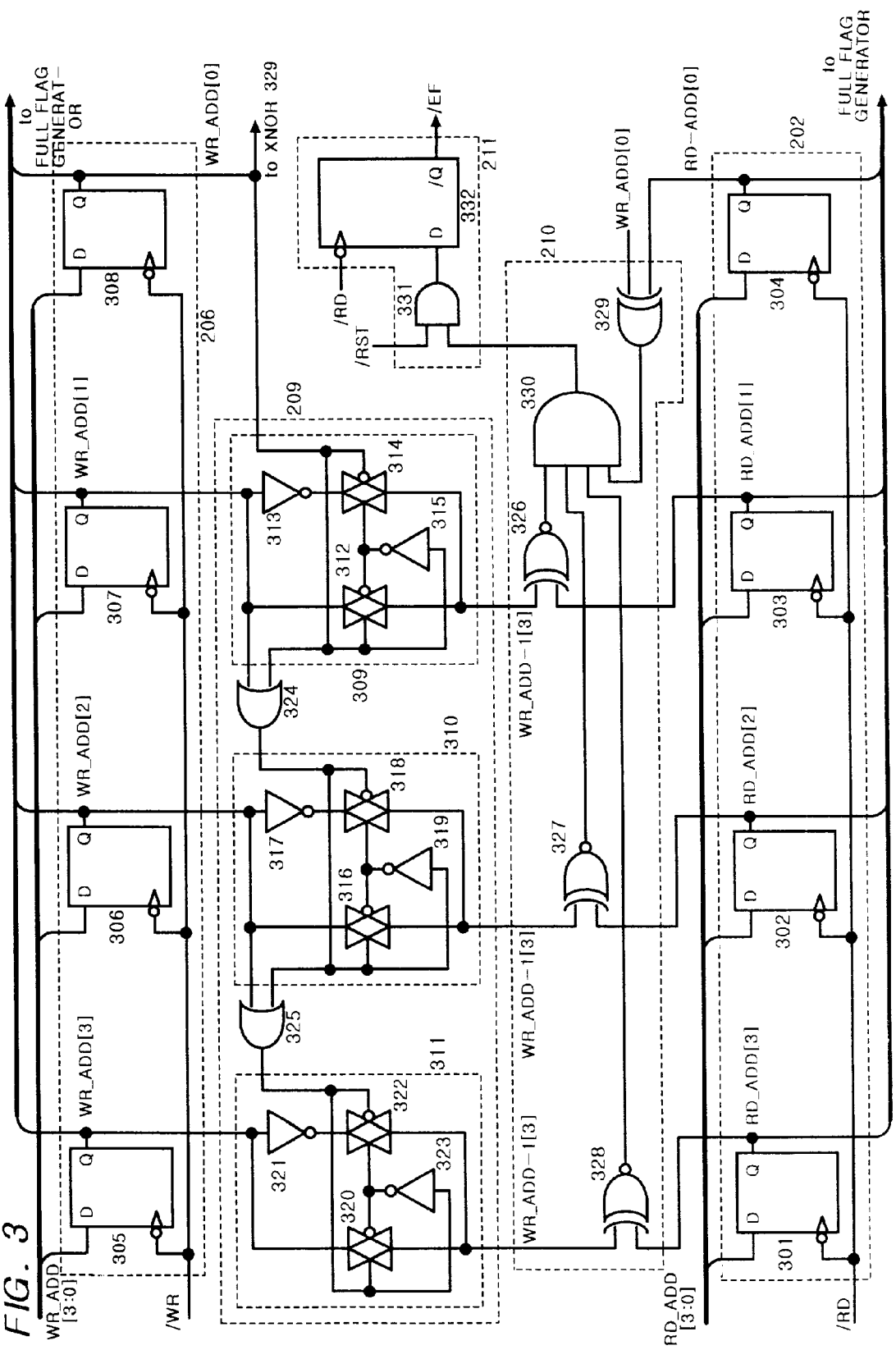
FIG. 3 shows a circuit of an empty flag generator according to the present invention.

FIG. 3 shows a circuit of an empty flag generator according to the present invention, which illustrating the read register 202, the write register 206 and the empty flag generator 203 in FIG. 2.

Referring to FIG. 3, the read register 202 is comprised of four D flip-flops 301 to 304 connected in series. Input data of each D flip-flop 301 to 304 constituting the read register 202 is a unit bit of a read address RD_ADD[3:0] wherein a read signal /RD is used as a clock. Each output of the D flip-flops 301 to 304 as a read address RD_ADD[3:0] is transferred to FIFO memory (not shown in the drawing) and a pre-empty flag generator 210.

A write register 206, one of the components of the empty flag generator 203, consists of another four D flip-flops 305 to 308 connected in series one another. Input data of each D flip-flop 305 to 308 constituting the write register 206 is a unit bit of a write address WR_ADD[3:0] wherein a write signal /WR is used as a clock. Each output of the D flip-flops 305 to 308 as a write address WR_ADD[3:0] is transferred to FIFO memory and a subtracter 209.

The subtracter 209 consists of three unit bit generator 309 to 311. The unit bit generators 309 to 311 are of the same structures. Each unit bit generator 309 to 311 has an input and a control signal. The input is the upper three bits WR_ADD[3:1] of the above-mentioned write address, and the control signal uses the lower three bits WR_ADD[2:0] of the write address WR_ADD[3:0].

Considering control signals used for unit bit generators 309 to 311, the least significant bit of the write address WR_ADD[0] is used for the control signal in a first unit bit generator 309, an OR operational value of the lower two bits WR_ADD[1:0] of the write address is used for the control signal in a second unit bit generator 310, and an OR operational value of the lower third and second bits WR_ADD[2:1] of the write address is used for the control signal in a third unit bit generator 311.

The first unit bit generator 309 has the following constitution. The lower second bit WR_ADD[1] of the write address inputted to the first unit bit generator 309 is inputted to a transmission gate 312, and, after being inverted by an inverter 313, to another transmission gate 314.

Control signals for two transmission gates 312 and 314 use the least significant bit WR_ADD[0] of the write address. The transmission gate 312 becomes turned on when a logical value of the least significant bit WR_ADD[0] of the write address is 1, while the other transmission gate 314 becomes turned on when a logical value is 0. All the outputs of the transmission gates 312 and 314 are transferred to the pre-empty flag generator 210. An inverter 315 in the first unit bit generator 309 inverts the least significant bit, as the control signal, WR_ADD[0] of the write address.

In the first unit bit generator 309 relations between logical values of input and output in accordance with the control signal are in the following description.

When a logical value of the least significant bit WR_ADD[0] of the write address is 1, just the transmission gate 312 becomes turned on. In this case, as an input to the transmission gate 312 is the lower second bit WR_ADD[1], the output has the same logical value of the lower second bit WR_ADD[1] of the write address.

When a logical value of the least significant bit WR_ADD[0] of the write address is 0, just the transmission gate 314 becomes turned on. In this case, as an input to the transmission gate 314 is an inverted value the lower second bit WR_ADD[1] by the inverter 313, the output has the inverted logical value of the lower second bit WR_ADD[1] of the write address.

Namely, the first unit bit generator 309, when the logical value of the least significant bit WR_ADD[0] is 1, provides the same logical value of the input and the output. When the logical value is 0, the logical values of the input and the output are opposite each other.

The operational principle is also applied to the second and the third unit bit generator 310 and 311. Yet, we should pay attention to the fact that generated paths of the control signals used for the second and the third unit bit generator 310 and 311 are different from that of other control signal used for the first unit bit generator 309.

The control signal for the second unit bit generator 310 uses the OR operational value of the lower two bits WR_ADD[1:0] of the write address. An OR gate 324 of the subtracter 209 is used for generating the control signal. A logical value of the control signal of the second unit bit generator 310 becomes 1 provided that at least a bit having a logical value of 1 exists in the lower two bits WR_ADD[1:0] of the write address. However, a logical value of the control signal becomes 0 provided that the logical values of the lower two bits WR_ADD[1:0] of the write address are 0.

An input and an output of the second unit bit generator 310 have the same logical value provided that at least one of the lower two bits WR_ADD[1:0] has the logical value of 1. When both logical values of the lower two bits WR_ADD[1:0] of the write address are 0, the input and the output have logical values opposite each other.

This operational principle may be applied to the third unit bit generator 311. Yet, once at least one of the lower third and the lower second bit WR_ADD[2:1] of the write address has the logical value of 1, an input and an output, of the third unit bit generator 311 has the same logical value. And, when the logical values of the lower third and the lower second bit WR_ADD[2:1] of the write address are 0, the logical values of the input and the output have opposite values. An OR gate 325 of the subtracter 209 in FIG. 3 generates a control signal for the third unit bit generator 311.

The pre-empty flag generator 210 consists of a plurality of logic devices. Three exclusive NOR gate of two inputs 326 to 328 receive unit bits of 3 bit output of the subtracter 209 and other unit bits of the upper three bits RD_ADD[3:2] of the read address from the read register 202, respectively. Accordingly, each of the exclusive NOR gates 326 to 328 generates an output of the logical value of 1 when each logical value of unit bits of the upper three bits RD_ADD[3:1] and each logical value of unit bits of the outputs of the subtracter 209 is identical.

An exclusive OR gate 329 receives the least significant bit WR_ADD[0] of the write address and the least significant bit RD_ADD[0] of the read address. Thus, the exclusive OR gate 329 generates a logical value of 1 when a logical value of the least significant bit WR_ADD[0] of the write address is different from that of the least significant bit RD_ADD[0] of the read address.

The exclusive OR gate 329 prevents an error from comparing just the upper three bits WR_ADD-1[3:1] of a value of subtracting 1 from the write address to the upper three bits RD_ADD[3:1] of the read address.

When a write address WR_ADD[3:0] is 1110, a value WR_ADD-1[3:0] of subtracting 1 from the write address is 1101. And, When a write address WR_ADD[3:0] is 1101, the other value WR_ADD-1[3:0] of subtracting 1 from the Write address is 1100. In these two cases, each upper three bits of the subtracted values has the same value of 110. Namely, once both the upper three bits WR_ADD[3:1] and WR_ADD[3:1] are compared each other, the same results are calculated. Thus, an error may occur since there is no difference between when the read address RD_ADD[3:0] and the write address WR_ADD[3:0] have the same values of 1110 and 1110 and when they have the values of 1110 and 1101 from subtracting 1.

Accordingly, once the least significant bit RD_ADD[0] of the read address and the least significant bit WR_ADD[0] of the write address are processed by an exclusive OR operation, the error is avoided since the case at which two addresses have the same value is detected.

Outputs of the three exclusive NOR gates 326 to 328 and inputs of the exclusive OR gate 329 are inputted to an AND gate 330 of four inputs. Thus, the AND gate 330 generates an output of a logical value of 1 provided that all the logical values of the outputs of three exclusive NOR gates 326 to 328 and the exclusive OR gate 329 are 1. The output of the AND gate 330 is a pre-empty flag PRE_EF.

The main empty flag generator 211 consists of an AND gate 331 and a D flip-flop 332. The AND gate 331 receives the above-mentioned pre-empty flag PRE_EF and an active low reset signal /RST. As the reset signal /RST is an active low signal, a logical value becomes 0 only when a circuit is initialized. And, the logical value goes back to 1 after initialization. Accordingly, an output of the AND gate 331 is identical to a logical value of the pre-empty flag PRE_EF during the operation of the circuit.

An output of the AND gate 331 is inputted to the D flip-flop 332 as data wherein a read signal /RD is used as a clock. When an output of the AND gate 331 has a logical value of 1 and a logical value of the read signal goes down to 0, an active empty flag /EF of a logical value of 0 is generated from an inverted output terminal /Q of the D flip-flop 332. Provided that a pre-empty flag PRE_EF of a logical value of 0 is generated from the pre-empty flag generator 210, a logical value of an output of the AND gate 331 in the main empty flag generator 211 becomes 0. Thus, the logical value of the empty flag /EF becomes 1.

In order to generate normally a pre-empty flag PRE_EF of the present invention, the condition that subtracting a read address from a write address equals to 1(10) should be satisfactory. The pre-empty flag PRE_EF never occurs unless the condition is fulfilled.

When a write address WR_ADD[3:0] is 1101 and a read address RD_ADD[3:0] is 1011, the difference is 2(10). In this case, a logical value of a pre-empty flag becomes 0. However, the difference in the two addresses is 1(10) provided that a read address RD_ADD[3:0] is 1100. And, a logical value of the pre-empty flag becomes 1 in this case.

Upper three bits WR_ADD[3:1] of 110 are inputted to each unit bit generator 309 to 311 of the subtracter 209 provided that a write address WR_ADD[3:0] outputted finally from the write register 206 is 1101.

As the logical value of the least significant bit WR_ADD[0] of the write address is 1, in this case, an output of the first unit bit generator 309 in the subtracter 209 has a logical value of 0 identical to the input WR_ADD[1]. A logical value of an output of the OR gate 324 becomes 1 since the lower two bits WR_ADD[1:0] of the write address is 01. Thus, an output of the second unit bit generator 310 has a logical value of 1 the same as the input WR_ADD[2]. As the lower third and the lower second bit WR_ADD[2:1] of the write address are 10, an output of the OR gate 325 has a logical value of 1. Thus an output of the third unit bit generator 311 has a logical value of 1 the same as the input WR_ADD[3].

The output of the subtracter 209 through these series of procedures is 110, which means that the upper three bits WR_ADD-1[3:1] resulted from subtracting 1 from the write address WR_ADD[3:0] outputted finally from the write register 206 are 110.

In this case, once the read address RD_ADD[3:0] is 1011, outputs of two exclusive NOR gates 326 and 328 in the pre-empty flag generator 210 become a logic value of 1 but an output of the rest exclusive NOR gate 327 has a logical value of 0. Thus, a logical value, an output of the AND gate 330, of a pre-empty flag PRE_EF becomes 0.

As the logical value of the pre-empty flag PRE_EF outputted from the pre-empty flag generator 210 is 0, an output of the AND gate 331 in the main empty flag generator 211 has the same logical value of 0 as well. Namely, data having a logical value of 0 is inputted to the D flip-flop 332. In this case, an empty flag /EF outputted from the D flip-flop 332 has a logical value of 1 as a logical value of the read signal /RD becomes 0. Thereby, an empty flag /EF never occurs.

On the other hand, all the outputs of three exclusive NOR gates 326 to 328 in the pre-empty flag generator 210 have logical values of 1 provided that a read address RD_ADD[3:0] outputted from the read register 202 is 1110. Thus, a logical value of a pre-empty flag outputted from the AND gate 330 becomes 1.

As a logical value of a pre-empty flag PRE_EF outputted from the pre-empty flag generator 210 is 1, an output of the AND gate 331 in the main empty flag generator 211 has a logical value of 1 as well. Namely, data of a logical value of 1 is inputted to the D flip-flop. In this case, when a logical value of a read signal /RD becomes 0, an empty flag /EF outputted from the D flip-flop has a logical value of 0. Namely, an empty flag is generated.

FIG. 4 shows a truth table relating to operational characteristics of an empty flag generator according to the present invention, wherein the truth table relates to combinations of write address WR_ADD[3:0] and read address RD_ADD[3:0].

Referring to FIG. 4, when upper three bits WR_ADD-1[3:1] of a value resulted from subtracting 1 from a write address WR_ADD[3:0] and the other upper three bits RD_ADD[3:0] coincide with each other, all the outputs of three exclusive NOR gates 326 to 328 and an exclusive OR gate 329 become 1. Thus, a pre-empty flag PRE_EF outputted from an AND gate 330 has a logical value of 1.

The present invention generates a pre-empty flag in a clock ahead of a read address which is identical to a write address and, then, generates an empty flag as soon as a read address identical to the write address is generated after a elapse of one clock. Accordingly, the present invention provides an empty flag generated faster than the related art of providing an empty flag by comparing two addresses after a read address coinciding with a final value of a write address has been inputted.

It will be apparent to those skilled in the art that various modifications and variations can be made in a high speed empty flag generator of the present invention without departing from the spirit or scope of the inventions. Thus, it is intended that the present invention cover the modifications and variations of this invention provided they come within the scope of the appended claims and equivalents.

What is claimed is:

1. An empty flag generator in FIFO memory control circuit, comprising:

a subtracter generating upper N–1 bits of a value resulted from subtracting 1 from a write address of N bits;

a pre-empty flag generator generating an pre-empty flag when an output of upper N–1 bits of a read address of N bits and an output of N–1 bits of said subtracter coincide by comparison; and a main empty flag receiving said pre-empty flag, said main empty flag generator generating an empty flag at a generating point of a first read signal after said pre-empty flag.

2. The empty flag generator in FIFO memory control circuit according to claim 1, said subtracter further comprising:

at least a bit generator receiving a lower second bit of said write address, said bit generator controlled by a logical value of a least significant bit of said write address, wherein said bit generator generates a logical value of said lower second bit when a logical value of said least significant bit of said write address is 1, and wherein said bit generator generates an inverted value of a logical value of said lower second bit of said write address when a logical value of said least significant bit of said write address is 0.

3. The empty flag generator in FIFO memory control circuit according to claim 1, wherein said subtracter includes said bit generators of which number is at least N−1 when said write address or said read address is N bits.

4. The empty flag generator in FIFO memory control circuit according to claim 3, when said subtracter includes said bit generators of which number is at least N−1, wherein said bit generators receive unit bits of upper N−1 bits of said write address, and wherein said bit generators are controlled by an OR operational result of lower two bits.

5. The empty flag generator in FIFO memory control circuit according to claim 1, said pre-empty flag generator further comprising:

a first logic device carrying out logic operation of an output of said subtracter and upper N−1 bits of said read address;

a second logic device carrying out logic operation of a least significant bit of said write address and a least significant bit of said read address; and a third logic device generating said pre-empty flag by operating logically an output of said first logic device and an output of said second logic device.

6. The empty flag generator in FIFO memory control circuit according to claim 1, wherein said main empty flag generator further comprising, a D flip-flop receiving said pre-empty flag as data and said read signal as a clock signal, said D flip-flop outputting said empty flag to an inverting output terminal.

7. The empty flag generator in FIFO memory control circuit according to claim 6, said main empty flag generator further comprising, a fourth logic device receiving said pre-empty flag and a reset signal wherein an output therefrom is inputted to said D flip-flop.

8. A FIFO memory control circuit comprising:

a read counter increasing a read address of N bits by 1 every time a read signal is generated;

a write counter increasing a write address of N bits by 1 every time a write signal is generated;

an empty flag generator, said empty flag generator further comprising:

a subtracter generating upper N−1 bits of a value resulted from subtracting 1 from said write address;

a pre-empty flag generator generating a pre-empty flag when said N−1 bits of said read address and an output of N−1 bits of said subtracter are compared thereof and coincide; and a main empty flag generator receiving said pre-empty flag, said main empty flag generator generating an empty flag at a generating point of a first read signal after said pre-empty flag has been inputted, a full flag generator generating a full flag by comparing said read address to said write address; and a multiplexer transferring either said read address or said write address to FIFO memory.

9. The FIFO memory control circuit according to claim 8, said subtracter further comprising:

at least a bit generator receiving a lower second bit of said write address, said bit generator controlled by a logical value of a least significant bit of said write address, wherein said bit generator generates a logical value of said lower second bit when a logical value of said least significant bit of said write address is 1, and wherein said bit generator generates an inverted value of a logical value of said lower second bit of said write address when a logical value of said least significant bit of said write address is 0.

10. The FIFO memory control circuit according to claim 9, wherein said subtracter includes said bit generators of which number is at least N−1 when said write address or said read address is N bits.

11. The FIFO memory control circuit according to claim 10, when said subtracter includes said bit generators of which number is at least N−1, wherein said bit generators receive unit bits of upper N−1 bits of said write address, and wherein said bit generators are controlled by an OR operational result of lower two bits.

12. The FIFO memory control circuit according to claim 8, wherein said read address is inputted to said empty flag generator and said full flag generator through a read register.

13. The FIFO memory control circuit according to claim 8, wherein said write address is inputted to said empty flag generator and said full flag generator through a read register.

14. The FIFO memory control circuit according to claim 13, wherein said write register uses said write signal as a clock.

15. A method of generating an empty flag in FIFO memory circuit, comprising the steps of:

generating a pre-empty flag when upper N−1 bits of a value resulted from subtracting 1 from a write address of N bits coincide with an output of upper N−1 bits of a read address of N bits by comparison; and generating an empty flag at a generating point of a first read signal after said pre-empty flag has been generated.

* * * * *